Jan. 20, 1948.     Z. D. RUBEN     2,434,747
FLUID POWER UNIT
Original Filed March 15, 1943    3 Sheets-Sheet 1
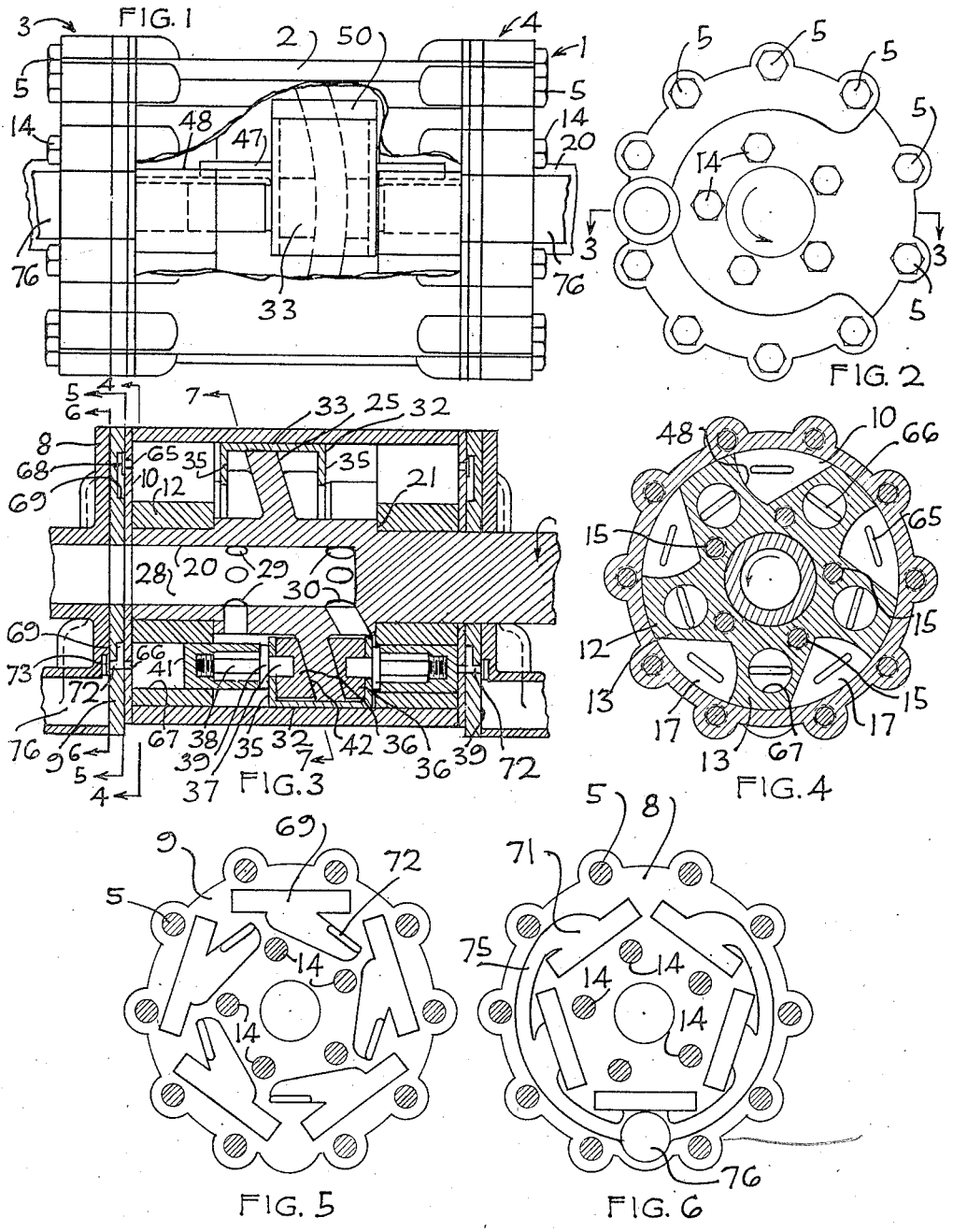
INVENTOR.
ZORRO D. RUBEN Jan. 20, 1948.   Z. D. RUBEN   2,434,747
FLUID POWER UNIT
Original Filed March 15, 1943   3 Sheets-Sheet 2

INVENTOR.
ZORRO D. RUBEN
BY Morris Spector
atty

Jan. 20, 1948.                    Z. D. RUBEN                    2,434,747
                                FLUID POWER UNIT
              Original Filed March 15, 1943        3 Sheets—Sheet 3
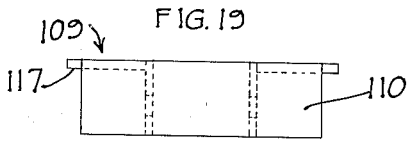
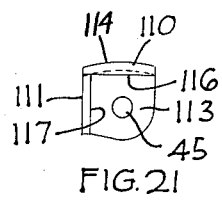
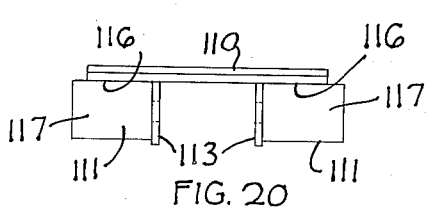
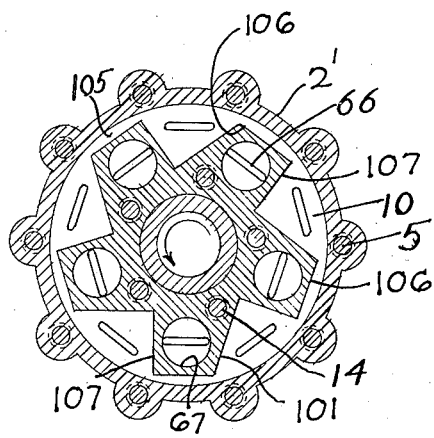
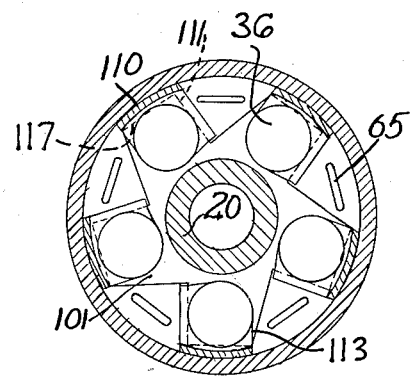
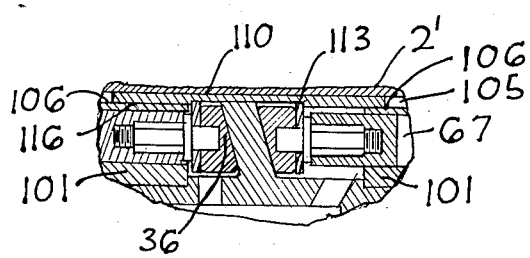
INVENTOR.
ZORRO D. RUBEN
BY
*Morris Spector*
atty.

Patented Jan. 20, 1948

2,434,747

UNITED STATES PATENT OFFICE 2,434,747

FLUID POWER UNIT

Zorro D. Ruben, Chicago, Ill.

Continuation of application Serial No. 479,289, March 15, 1943. This application March 26, 1945, Serial No. 584,784

28 Claims. (Cl. 103—173)

This application is a continuation of my pending application Serial No. 479,289, which was filed March 15, 1943 now forfeited.

The present invention relates to mechanism for the interconversion of reciprocating and rotating motion, particularly a crankless mechanism. More specifically the present invention relates to mechanisms of the above type which are applicable to interconnect one or more reciprocating pistons with a rotating shaft, as in an engine, a pump, a compressor, or wherever a reciprocating piston is to drive or be driven by a rotating shaft.

One of the features of the present invention resides in the means employed to connect a reciprocating piston with a rotating cam which coacts with a stationary casing to eliminate or substantially reduce certain types of stresses. It is one of the objects of the present invention to provide a connection between a rotating axial cam and a reciprocating piston in which the total weight of the parts is reduced to a minimum, and wherein the reciprocating mass is likewise reduced to a minimum so that the total weight of the unit and the inertia of the reciprocating parts are both minimized.

It is a further object of the present invention to provide such a connection which is particularly applicable to mechanisms operating at very high unit pressures as, for instance, for aircraft type hydraulic pumps or fluid motors which operate at pressures in excess of 1500 pounds per square inch.

It is a further object of the present invention to provide such a pump of reduced size and weight in relation to its displacement and operating pressure.

It is a further object of the present invention to provide such a mechanism with non side thrust pistons, and which will have minimum bearing loads.

It is a still further object of the present invention to provide an improved valve arrangement and intake and discharge passageways for a high pressure pump.

It is a still further object of the present invention to provide such a pump with fluid intake passages so arranged as to effect centrifuge cooling of the pump unit by the fluid being pumped.

The attainment of the above and further objects of the present invention will be apparent from the following specification taken in conjunction with the accompanying drawings forming a part thereof.

In the drawings:

Figure 1 is a plan view of a pump embodying the present invention, with part of the pump casing broken away to illustrate the interior construction;

Figure 2 is an end view of the pump of Figure 1;

Figure 3 is a sectional view taken along the line 3—3 of Figure 2;

Figure 4 is a sectional view taken along the line 4—4 of Figure 3;

Figure 5 is a view showing the intermediate valve plate of the pump of Figure 1, said view being a section taken along the line 5—5 of Figure 3;

Figure 6 is a view showing the valve cover of the pump of Figure 1, said view being a section taken along the line 6—6 of Figure 3;

Figure 16 is a fragmentary longitudinal sectional view of a modified form of yoke and the associated part of the cam and adjacent pistons;

Figure 19 is a top view of a modified yoke construction;

Figure 20 is a side view of the yoke of Figure 19;

Figure 21 is a left hand end view of Figure 20;

Figure 22 is a sectional view, corresponding to Figure 4, of a pump employing the yoke of Figures 19 through 21;

Figure 23 is a sectional view, corresponding to Figure 7, of a pump employing the yoke of Figures 19 through 21; and Figure 24 is a fragmentary longitudinal sectional view of a part of a pump employing yokes of the type illustrated in Figures 19 through 21.

Figure 8:
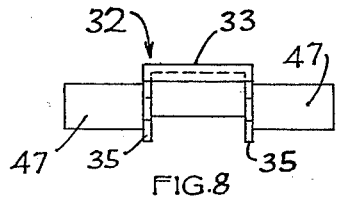
Figures 8 and 9 are, respectively, side and end views of a yoke used on the pump of Figure 1.

Reference may now be had more particularly to Figures 1 through 9 which illustrate the principles of the present invention as applied to a high pressure oil pump such as may be used on air craft or the like to supply oil under pressure for operating pilot motors or the like. The oil pump includes a rotatable shaft having an axial cam projecting therefrom and rotating therewith. The cam actuates reciprocating pistons in two groups of cylinders located on opposite sides of the cam. Each group of cylinders in this instance consists of five cylinders so that the pump is a ten cylinder pump, although it is within the purview of this invention to provide a greater or lesser number of cylinders to each group or to include only one group of pump cylinders. In the present instance the pump is indicated by the reference numeral 1 and includes a cylindrical casing 2, to the opposite ends of which are secured similar cylinder block assemblies 3—4 as by a series of bolts 5 that extend through the cylinder block assemblies and are threaded into tapped holes in the ends of the casing 2. Each cylinder block assembly includes a valve cover plate 8, an intermediate valve plate 9 and a cylinder block cover plate 10. Each of these three plates has aligned holes for receiving the shanks of the bolts 5. Each cylinder block assembly 3—4 has, in addition, a cylinder block 12 bolted thereto. The cylinder block 12 is star-shaped, having a number of arms or projections 13—13 of identical shape extending from the center thereof. The projections are uniformly spaced apart and there are as many projections 13 as there are cylinders in the group comprising the cylinder block assembly, in this instance five. The cylinder block 12 is secured as a part of the cylinder block assembly by bolts 14 which pass through aligned openings in the valve cover plate 8, the intermediate valve plate 9, and the cylinder block cover plate 10, the bolts then threading into tapped holes 15 in the cylinder block 12. The approximately triangular shaped spaces 17 between adjacent projections 13 of the cylinder block constitute passageways for the flow of oil to the cylinders during the pumping action, as will be more readily explained, which flowing oil serves to facilitate cooling of the unit.

A hollow shaft 20 is journalled at one end to rotate in a central bore in the cylinder block 12 and the opposite end to rotate in a similar journalled bore in a similar cylinder block at the opposite side of the unit. The shaft 20 has shoulders 21 for limiting its longitudinal movement. The shaft also has an axial cam plate 25 integral therewith and projecting therefrom at an inclination to the longitudinal axis of the shaft. The right hand end of the shaft 20 is solid and preferably constitutes the driving end for rotating the shaft. The left hand end of the shaft is hollow, forming an oil inlet passageway 28 from which a series of radial ducts 29 open on one side of the cam and a similar series of ducts 30 open on the other side of the cam.

The cam 25 has five uniformly spaced identical metal yokes 32 sliding thereon. Each yoke is of a construction such as is illustrated more fully in Figures 1, 3, 7, 8 and 9 and includes a thin web portion 33 the inner surface of which is in contact with the cam and the outer surface of which is in contact with the inner periphery of the casing 2. The web 33 has a pair of thin radially inwardly projecting arms 35—35 that embrace the cam and constitute journals for shoes 36—36. Each shoe 36 is journalled for rotation about a stud 37 on a piston rod 38 which has a flange 39 that bears against and is welded to the outside of the ear 35. A piston 41 is threaded on the opposite end of the piston rod 38. The construction of the piston, piston rod and the connection between the piston rod and the ear 35 and the journal connection between the piston rod stud 37 and the shoe 36 may be like that more fully shown and described in my prior application Serial No. 470,679, filed December 30, 1942, issued as Patent No. 2,364,099, December 5, 1944, to which reference may be had. It is sufficient here to state that the skirt of the piston bears against the flange 39 of the piston rod and thus supports the thin ear 35, and that the surface 42 of the rotatable shoe slides on the engaged surface of the cam.

The two ears 35 of the yoke have aligned openings 45 therein (Fig. 9) through which the studs 37 of the corresponding piston rods on opposite sides of the cam extend. In addition each ear 35 has a thin arcuate shaped trunnion 47 projecting at right angles therefrom, the two trunnions being in alignment as may be seen from Figures 8 and 9. Each trunnion 47 slidably engages a surface 48 of the corresponding projection 13 of the associated cylinder block and has a free sliding movement thereon. In addition, the web 33 of each yoke 32 has a projection 50 that slides in a longitudinally extending slot 51 on the inner periphery of the cylindrical casing 2. The trunnion bearing surface 48 on which the trunnion 47 slides is of the same curvature as that of the trunnion surface and is preferably an arc of a circle centered approximately at the projection 50. Each of the five slots 51, one for each yoke, extends the full length of the casing, to allow a simple broaching operation in its manufacture, the slots being parallel to one another and parallel to the longitudinal axis of the shaft 20. Each yoke is free to slide lengthwise in the casing 2 under control of the cam as the shaft 20 is rotated, but each yoke is held against rotation with the cam. To facilitate wedge film lubrication between bearing shoes 36 and a cam each ear 35 is slightly tapered in thickness, being a trifle thicker towards the shoe at its trailing edge 54 than it is at its leading edge 55.

An explanation will now be given of the valve construction for the pump. The cylinder block cover plate 10 has five elongated slots 65 therethrough constituting intake passages which open into the spaces 17 between adjacent projections 13 of the cylinder block 12. In addition, the cylinder block cover plate has five more elongated slots 66 therethrough which constitute intake and discharge cylinder ports. The slots 66 open into cylindrical holes 67 in the cylindrical block 12 which constitute the cylinders for the pistons 41. On the other side of each hole 65 is a suction operated flutter valve 68 which may consist of a flat strip of spring steel that lies in an intake cavity 69 in the intermediate valve plate 9 (Fig. 5). The suction valve 68 is kept closed by discharge pressure during the discharge stroke and automatically opens on the suction stroke of the piston that creates a reduced pressure in the intake cavity 69 below the pressure in the space 17. The intake cavity 69 provide communication between the intake passage 65 and the associated cylinder port 66, under control of the automatic valve 68. The intake cavity 69 also provides communication with a discharge valve cavity 71 through an opening 72 in the intermediate valve plate 9, which opening 72 is covered by an automatic discharge valve 73. During the suction stroke of the piston the automatic discharge valve is kept closed by pressure of the discharged fluid in its receiver. During the discharge stroke the valve 73 is opened by pressure developed by the piston, which presure forces liquid from the cylinder 67, through the cylinder port 66, to the intake cavity 69. The same pressure serves to maintain the suction valve 68 closed. The oil discharges through the valve 73 into an intake manifold 75 leading to a discharge duct 76.

An explanation will now be given of the manner of operation of the pump. Upon rotation of the shaft 20, and with it the cam 25, the respective yokes 32 are reciprocated, each yoke travelling through a complete forward and reverse cycle once for every revolution of the shaft. Consider, by way of example, the cylinders at the bottom of Figure 3. As the cam is rotated the lowermost yoke is moved to the left, pushing one piston to the left and pulling the other piston on the opposite side of the cam also to the left. The piston that is pulled to the left is at this time making its intake stroke and therefore requires very little force. The piston that is being pushed to the left is making its discharge stroke. The cam acts upon the rotatable shoe 36, which acts through the flange 39 and the piston rod 38 to push the piston into its cylinder. At the same time the intake piston moves outwardly of its cylinder and draws oil from the adjacent space 17, through the ducts 30 from the shaft core 28. At the same time the piston diagonally opposite that intake piston is also about to make an intake stroke drawing in oil via the ducts 29. The intake oil is thus continually moved along the outside of the cylinder blocks and thus serves to keep the cylinder blocks cool.

The relatively flexible connection of the piston rod to the ear of the yoke allows a clearance movement of the yoke between the cam and the inner periphery of the casing 2 and the tangential bearing surfaces without communicating side thrust forces to the piston. This is so because the side thrust caused by the pressure of the cam upon the rotating shoe bearing is supported entirely by the yoke bearing surfaces, to-wit, the bearing surface between the outer periphery of the cam and the inner periphery of the web of the yoke, that between the inner wall of the casing and the outer wall of the web, the bearing surfaces between the trunnions 47 and the associated surfaces 48, and the locating contact surface between the projection 50 on the yoke and the associated slot 51 in the cylindrical casing.

When the piston is in its outermost position in the cylinder it is supported against tipping by reason of the fact that there is contact between the piston skirt and the flange 39 that is welded to the adjacent ear 35 of the yoke. When the piston is being drawn out of the cylinder, as at the beginning of the intake or suction stroke, the contact of the piston skirt with the flange 39 that is welded to the ear surface supports the ear against flexing. This permits the use of a thin section for the ears 35. The present construction permits formation of the yoke of thin material since the yoke sections are supported by adjacent members whenever subjected to stress.

Lateral forces operating on the yoke or the bearing stud 37 are at times directed outwardly, that is, against the casing 2, and at other times inwardly, that is, against the cam, and at still other times tangentially, in the direction of motion of the cam. The yoke trunnion bearing surfaces are so located that tangential components of the forces are supported by them without introducing radial reaction. The projection 50 allows a small amount of clearance pivotal movement of the yoke towards and away from the center of rotation of the cam and the construction and location of the trunnion bearing surfaces are such as to permit that slight pivotal action about the projection 50, that is, at the entering side of the yoke with respect to direction of rotation of the cam. Wedge film lubrication is therefore maintained between the yoke and the cam bearing surfaces by thus controlling the location of the radial reaction. Radial components of lateral forces are therefore likewise supported by the radial bearing surfaces without the introduction of a tangential reaction.

Because the yoke 32 is thin and flexible it is possible, in the initial construction of the yoke, to make the ears 35—35 a distance apart such that there is no clearance space between the respective shoes and the cam or even negative clearance. This overcomes an objectionable tendency inherent in the rigid yoke structures of the prior art where clearance is provided, in that in those structures the turning force that is applied by the cam against the shoe during alternate piston reciprocation is applied to the edge of the shoe. When the clearance initially is negative, that is, the initial distance between the ears 35—35 is slightly less than required for embracing the cam and the shoes 36, the ears flex apart the small amount necessary to overcome the negative clearance. As a result each ear exerts a slightly greater pressure against the part of the shoe which is radially outermost from the center of the shaft 20. This is a desirable characteristic.

From the above description it is apparent that the pump mechanism above described utilizes a very simple form of crankless or swash plate mechanism. The reciprocating parts, to-wit, the pistons, yokes, connecting rods and bearings are constructed in such a manner as to result in a unit of a minimum size and weight for a given displacement and pressure developed.

Figure 11:
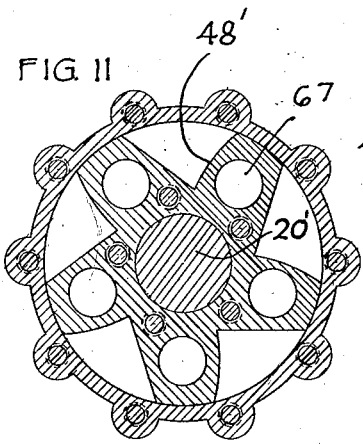
Figure 11 and 12 are sectional views corresponding to Figures 4 and 7, respectively, of a modification of Figure 1 as required for fluid motor operation.
Figure 10:
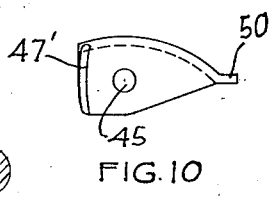
Figure 10 is a view corresponding to Figure 9 showing an end view of a modified yoke construction for use on a fluid motor.
Figure 12:
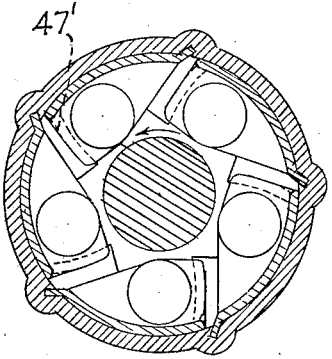
Figure 14:
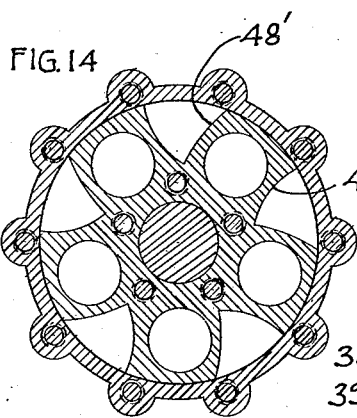
Figures 14 and 15 are sectional views corresponding to Figures 4 and 7, respectively, of a modification of Figure 1 as required for operation as a compression engine such as an internal combustion engine.
Figure 13:
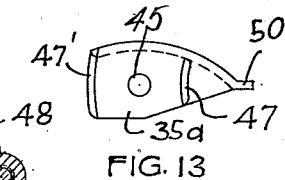
Figure 13 is an end view of still another modified yoke construction adapted for use on compression engines such as, for instance, an internal combustion engine.
Figure 15:
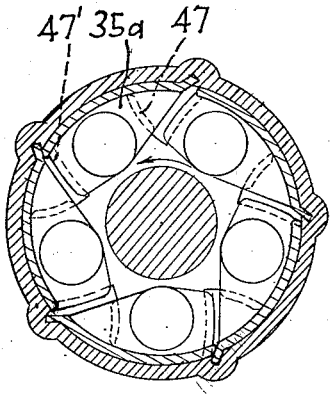

In the case of a pump the high pressure occurs only at the time the piston is moving into the cylinder, that is, during the discharge stroke, and the trunnion bearing surfaces are arranged to support tangential lateral force components directed parallel to the direction of motion of the cam at the stud. On the other hand, in the case of a fluid motor the high pressure is developed when the piston is moving out of the cylinder, rather than into the cylinder. In that case the trunnions on the yokes are preferably located on the opposite side of the stud 37, with respect to the direction of rotation of the cam. In this manner they support tangential lateral force components which occur opposite to the direction of motion of the cam. This is illustrated in Figure 10, wherein the curved trunnions 47', whose curvatures are centered at the projection 50, are located on the opposite side of the stud-receiving openings 45. To that effect the arms of the cylinder block 12 are somewhat differently curved to provide a curved surface 48' on which the trunnions 47' fit and slide. The surface 48' is on the opposite side of the cylinder 67 than that on which the surface 48 of Figure 4 is located, it being assumed that the direction of rotation of the shaft 20', in the case of a fluid motor, is the same as the direction of rotation of the shaft 20 of the pump of Figure 3. The valve arrangement of the fluid motor of Figures 11 and 12 have not been illustrated since it may be of any desired type of valve action known in the art.

During the compression stroke, in the case of an internal combustion engine, the piston acts as in a pump, and during the power stroke the piston acts as in a fluid motor. Thus at one time in the cycle of operation of the piston in an internal combustion engine the requirements, insofar as concerns the stresses on the yoke, are like those of a fluid pump and at another time in the cycle of operation the requirements are like those of a fluid motor. To meet both of those requirements the yoke, in the case of an internal combustion engine, is constructed so that each ear 35a thereof has a trunnion 47 located in the same manner as is the corresponding trunnion in the yoke of Figure 9 and has another trunnion 47' constructed and located in the same manner as are the trunnions 47' of Figure 10. In the case of an internal combustion engine the projections 13 of the cylinder block are provided with the curved surfaces 48 upon which the trunnions 47 slide and with curved surfaces 48' upon which the trunnions 47' slide. In other respects the operating connections between the cam and the piston, in the case of an internal combustion engine, or a fluid motor, are the same as in a pump as described above. In the case of an internal combustion engine, which may be of the Diesel type or of the ignition type, the valve arrangement for controlling the fuel and air intakes and the exhaust discharge may be of any of the types known in the art.

Figure 17:
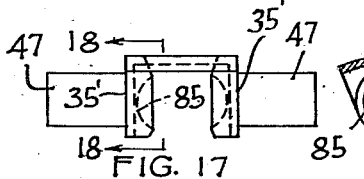
Figure 17 is a side view of the yoke of Figure 16.
Figure 18:
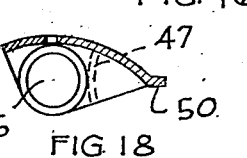
Figure 18 is a sectional view taken along the line 18—18 of Figure 17.

Figures 16, 17 and 18 show a modified form of yoke adapted to use a slipper or shoe of a different construction from that of Figure 1. Insofar as the structure of Figures 16, 17 and 18 is the same as that previously described, similar reference numerals have been used. This yoke differs from the yoke 32 essentially in that each ear 35' of this yoke is provided with a hemispherical socket 85 which constitutes a bearing for a shoe 36'. The back surface of the shoe 36' is a semi-sphere of the same radius as that of the socket 85 so that the shoe and the ear 35' form a ball and socket joint. The surface of the shoe opposite its semi-spherical surface is perfectly flat and smooth and bears against the side surface of the cam 25 as in the previous construction. This yoke, as the previous yoke, is provided with a projection 50 which rides in a slot or flute in the casing 2, as previously described. Here, as before, the piston rod 38 is provided with a flange 39 that is welded or otherwise secured to the outer surface of the thin ear 35'. The shoe 36' and the ball and socket joint between it and the ears 35' may also be used on yokes having the trunnion arrangements of Figure 9 or 10.

Reference may now be had to Figures 19 through 24 wherein are illustrated fragmentary parts of a pump employing still another type of yoke. Insofar as the structure of these figures is the same as that of the pump previously described, similar reference numerals have been used. In this pump the cylinder block cover plate 8, the intermediate valve plate 9, the valve cover plate 10, the shaft 20 and cam 25 are all of the same construction as in Figure 1. The casing 2' is also of substantially the same construction, differing therefrom only in that here the interior periphery does not have the slots 51, being instead an uninterrupted cylindrical bore. The cylinder block is illustrated in general by the reference numeral 101 and is mounted in place in the same manner as is the cylinder block 12 of Figure 1. The cylinder block 101 has a number of arms projecting from the center thereof, one for each piston cylinder, and has the piston cylinders 67 formed therein as in the case of the cylinder block 12. Each of the arms of the cylinder block 101 terminates short of the inner periphery of the casing 2' by an amount sufficient to allow a space 105 within which a projection on the yoke, to be presently described, slides. Each arm of the cylinder block 101 has a plane bearing surface 106 which supports inward radial components of the lateral thrust upon the yoke resulting from the pressure between the cam and the bearing shoe 36. Each arm of the cylinder block also has a plane surface 107 on which another surface projecting from the yoke, to be presently described, slides, said surface 107 supporting tangential components of the lateral thrust upon the yoke resulting from the action of the cam on the bearing shoe 36.

Reference may now be had particularly to Figures 19 through 21 illustrating the yoke used in connection with this pump. This yoke, indicated by the reference numeral 109, is of a generally angular shape consisting of a top plate 110 having an angle leg 111—111, cut away at its center, and having a pair of ears 113—113 each being welded to the inner side of the top plate 110 and to the edge of a leg 111. The ears 113 correspond, functionally, to the ears 35 of the yoke 32. The outer surface 114 of the top plate 110 is on a radius equal to that of the inner periphery of the casing 2'. The inner periphery of the plate 110 is curved, but only between the ears 113—113, on the same radius of curvature as the outer periphery of the cam. The ears 113 have aligned openings 45 as in the yoke previously described. The yoke is assembled on the cam with the ears 113—113 embracing the cam and receiving the bearing shoes 36 as before. The surface 114 of the top plate 110 is in sliding engagement with the casing 2' and may clear the cam by a small fraction of an inch, or may slide on the outer periphery of the cam with a very slight pressure. The plane inner surface 116 of the top plate 110 slides on the bearing surface 106 of the cylinder block, and the plane inner surface 117 of the plate 111 slides on the plane surface 107 of the cylinder block.

The yoke of Figures 19 through 21 eliminates the projection 51 of the yoke previously described because the corresponding inwardly radial component of the stress is now taken by the projecting surface 116 external to the portion of the yoke that embraces the cam. This eliminates the need of a wide web for the yoke, as in Figure 7, and eliminates the need of the slots 51 in the casing. Furthermore, it substantially reduces the size of each ear 113 in comparison with the corresponding ears 35 of the yoke previously described. The yoke of Figures 19 through 21 can be constructed to utilize the flat back type of bearing shoe or the universal motion bearing shoe of Figure 16 as desired, and the ears 113 may be tapered in thickness for the same reason and in the same manner as are the ears 35, previously described.

Figure 9:
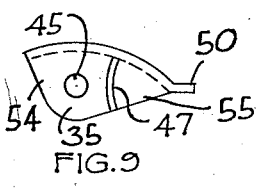
Figure 7:
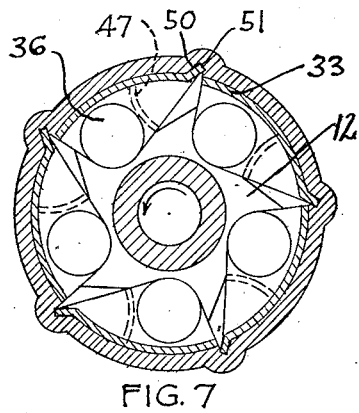
Figure 7 is a sectional view taken along the line 7—7 of Figure 3.

It is to be noted that in the yoke of Figures 19 through 21 the angle legs 111 correspond functionally to the trunnions 47 of the yoke of Figures 8 and 9. The top plate 110 performs the function of the web 33 of the yoke of Figure 8, differing therefrom essentially in that in the yoke of Figure 20 that function is performed by the surfaces 116 external of the ears 113, whereas in the first described yoke that function is performed by the structure between the ears. The portion of the top plate 111 between the ears 113 serves principally to connect the two ears. The ears 113 of this yoke may be spaced apart in the same manner as previously described in connection with the ears 35, to preload the bearings 36. The yoke of Figures 19 through 21 is also made of thin section metal so as to retain the flexibility features previously described.

Since the yoke of Figures 19 through 21 removes the inwardly radial bearing load of the yoke upon the cam this construction allows a great freedom of choice in the selection of the type of cam to be used, of which many are known in the art. For instance, if desired a variably inclined type of cam may be used with the yoke of Figures 19 through 21 to produce a variable pump delivery.

The principle correlating the construction of the yoke of Figure 1 and that of Figure 19, is that the two bearing surfaces, namely, radial and tangential bearing surfaces, provided to sustain the lateral forces operating on the stud 37, are substantially in planes at right angles to each other and they are located with respect to the axis of the stud 37 in such a manner that the resultant pressures on the bearing surfaces (neglecting friction) pass through the stud axis. Also all three forces, (1) lateral forces imposed upon the yoke stud, (2) tangential bearing surface reaction, (3) radial bearing surface reaction, are concurrent when projected in a lateral plane.

In compliance with the requirements of the patent statutes I have herein shown and described a few preferred embodiments of the present invention. It is, however, to be understood that the invention is not limited to the precise constructions here shown, the same being illustrative of the principles of the invention. What is considered new and desired to be secured by Letters Patent is:

1. A pump having a rotatable cam inclined to its axis of rotation, a yoke straddling the cam and having a pair of ears on opposite sides of the cam, bearings between the ears and opposite sides of the cam, at least one of said ears having a projection extending therefrom in a direction parallel to the axis of rotation of the cam, a casing within which the cam and the yoke are located, a cylinder block at one end of the casing, said block having a cylinder formed therein, a piston in the cylinder, a connection between the piston and the ear of the yoke, said block having a guiding surface on which said projection bears and slides.

2. A pump comprising a casing, a cylinder block at an end of the casing, a rotatable shaft extending in the casing and having an inclined cam in the casing, cylinders formed in the cylinder block with their longitudinal axes parallel to the axis of rotation of the shaft, pistons in the cylinders, driving connections between the pistons and the cam including yokes for the respective pistons straddling the cam and each having a trunnion projecting therefrom parallel to the axis of the shaft, the cylinder block having trunnion guiding surfaces on which the trunnions of the yokes bear.

3. A pump comprising a casing, a cylinder block at an end of the casing, a rotatable shaft extending into the casing and having an inclined cam projecting therefrom in the casing, said block having a plurality of spaced arms projecting from the center thereof, cylinders formed in the respective arms with their longitudinal axes parallel to the axis of rotation of the shaft, pistons in the cylinders, driving connections between the pistons and the cam including yokes for the respective pistons straddling the cam and each having a trunnion projecting therefrom parallel to the axis of the shaft, each arm of the cylinder block having a trunnion guiding surface on which the trunnion of the associated yoke bears, a fluid passageway leading into the casing adjacent the cam, intake passageways for the respective cylinders opening from the cylinders into the casing whereby the fluid pumped flows through the casing and between said arms thereby serving to cool the guiding surfaces between the cylinder block and the trunnions, and means forming discharge passageways for the cylinders.

4. A pump comprising a casing, a cylinder block at an end of the casing, a rotatable shaft extending centrally through the cylinder block and having an inclined cam in the casing, said block having a plurality of spaced arms projecting from the center thereof, cylinders formed in the respective arms with their longitudinal axes parallel to the axis of rotation of the shaft, pistons in the cylinders, driving connections between the pistons and the cam including yokes for the respective pistons straddling the cam and each having a trunnion projecting therefrom parallel to the axis of the shaft, each arm of the cylinder block having a trunnion guiding surface on which the trunnion of the associated yoke bears, a fluid passageway through the shaft and opening into the casing, cover means for the outer side of the cylinder block, intake and discharge passageways for the respective cylinders formed in said cover means, one set of said passageways opening from the cylinders into the casing whereby the fluid pumped flows through the casing and between said arms thereby serving to cool the guiding surfaces between the cylinder block and the trunnions.

5. A pump comprising a casing, a cylinder block at an end of the casing, a rotatable shaft extending centrally through the cylinder block and having an inclined cam in the casing, said block having a plurality of spaced arms projecting from the center thereof, cylinders formed in the respective arms with their longitudinal axes parallel to the axis of rotation of the shaft, pistons in the cylinders, driving connections between the pistons and the cam, a fluid passageway through the shaft and opening into the casing, cover means for the outer side of the cylinder block, intake and discharge passageways for the respective cylinders formed in said cover means, one set of said passageways opening from the cylinders into the casing whereby the fluid pumped flows through the casing and between said arms thereby serving to cool the pump driving connections within the casing.

6. A fluid power unit comprising a casing, a cylinder block at an end of the casing, a rotatable shaft extending into the casing and having an inclined cam in the casing, said block having a plurality of spaced arms projecting from the center thereof, cylinders formed in the respective arms with their longitudinal axes parallel to the axis of rotation of the shaft, pistons in the cylinders, driving connections between the pistons and the cam including yokes for the respective pistons straddling the cam and each having a trunnion projecting therefrom parallel to the axis of the shaft, each arm of the cylinder block having a trunnion guiding surface on which the trunnion of the associated yoke bears, a fluid passageway leading into the casing adjacent the cam, intake and discharge passageways for the respective cylinders, one set of said passageways opening from the cylinders into the casing whereby the fluid for the unit flows through the casing and between said arms thereby serving to cool the guiding surfaces between the cylinder block and the trunnions.

7. In combination with a rotatable cam inclined to its axis of rotation, a yoke straddling the cam and having a pair of ears on opposite sides of the plate, bearings between the ears and opposite sides of the cam and in engagement with the plate, at least one of said ears having a yoke-guide projecting therefrom in a direction parallel to the axis of rotation of the cam.

8. In combination with a rotatable cam inclined to its axis of rotation, a yoke straddling the cam and having a pair of ears on opposite sides of the cam, bearings between the ears and opposite sides of the cam, said ears being flexible and being flexed by the cam and the bearings to maintain at least one of the bearings in pressure engagement with the cam.

9. In combination with a rotatable cam inclined to its axis of rotation, a yoke straddling the cam and having a pair of ears on opposite sides of the cam, bearings between the ears and opposite sides of the cam, said ears being flexible and being flexed by the cam and the bearings to maintain at least one of the bearings in pressure engagement with the cam, at least one of said ears having a trunnion projecting therefrom in a direction parallel to the axis of rotation of the cam.

10. In a crankless mechanism including a reciprocating piston and an inclined axially rotatable cam, a yoke interconnecting the two, said yoke comprising a web portion having a pair of ears projecting therefrom, the web of the yoke having a guiding projection and at least one of the ears having a yoke-guiding trunnion projecting therefrom.

11. In a crankless mechanism including a reciprocating piston and an inclined axially rotatable cam, a yoke interconnecting the two, said yoke comprising a web portion having a pair of ears projecting therefrom, the web of the yoke having a yoke-guiding projection and at least one of the ears having a projecting yoke-guiding trunnion including a curved bearing surface the center of which is at the guiding projection.

12. In a crankless mechanism including a reciprocating piston and an inclined rotatable cam, a yoke interconnecting the two, said yoke comprising a web portion having a pair of flexible ears projecting therefrom, the web of the yoke having a yoke-guiding projection located at its entering side with respect to the direction of rotation of the cam, and at least one of the ears having a projecting yoke-guiding trunnion including a curved bearing surface.

13. Means for interconnecting a reciprocable piston with a rotatable cam, said means comprising a yoke having a web portion from which a pair of ears project, bearing shoes rotatably mounted on the inner sides of said ears, and means forming bearing surfaces for taking tangential components of reactions on the yoke, said last means comprising an outwardly extending projection on at least one of the ears.

14. A fluid power unit comprising a stationary structure including a cylinder block having parallel cylinders formed therein, pistons in the cylinders, a cam rotatable about an axis parallel to the longitudinal axes of the cylinders, driving connections between the pistons and the cam comprising yokes straddling the cam and reciprocating with their associated pistons, said stationary structure having two yoke-guiding surfaces substantially at right angles to one another for each yoke, and said yokes having cooperating surfaces bearing on the yoke-guiding surfaces and sliding thereon as the yokes reciprocate 15. A fluid power unit comprising a stationary structure including a cylinder block having parallel cylinders formed therein, pistons in the cylinders, a cam rotatable about an axis parallel to the longitudinal axes of the cylinders, driving connections between the pistons and the cam comprising yokes straddling the cam and reciprocating with their associated pistons, said stationary structure having two yoke-guiding surfaces substantially at right angles to one another for each yoke, at least one of said yoke-guiding surfaces for each yoke being formed on the cylinder block, and said yokes having cooperating surfaces bearing on the yoke-guiding surfaces and sliding thereon as the yokes reciprocate.

16. A fluid power unit comprising a stationary structure including a cylinder block having parallel cylinders formed therein, pistons in the cylinders, a cam rotatable about an axis parallel to the longitudinal axis of the cylinders, driving connections between the pistons and the cam comprising yokes straddling the cam and reciprocating with their associated pistons, said stationary structure having two yoke-guiding surfaces substantially at right angles to one another for each yoke, at least one of said yoke-guiding surfaces for each yoke being formed on the cylinder block, and said yokes having cooperating surfaces bearing on the yoke-guiding surfaces and sliding thereon as the yokes reciprocate, the web of each yoke being out of pressure contact with the cam.

17. A crankless mechanism comprising a reciprocating piston, a cylinder for said piston, means forming a guide surface parallel to the longitudinal axis of the cylinder and located along the side of the cylinder, an axial cam the axis of which is parallel with the longitudinal axis of the cylinder, and a connection between the cam and the piston, said connection including a yoke connected to and reciprocating with the piston and guiding the end of the piston, said yoke bearing against the guide surface along the side of the cylinder and being guided by said surface as the yoke reciprocates with the piston.

18. A crankless mechanism comprising a reciprocating piston, a cylinder for said piston, means forming a guide surface parallel to the longitudinal axis of the cylinder and located along the side of the cylinder, an axial cam the axis of which is parallel with the longitudinal axis of the cylinder, a connection between the cam and the piston, said connection including a yoke connected to and reciprocating with the piston and guiding the end of the piston, said yoke bearing against the guide surface along the side of the cylinder and being guided by said surface as the yoke reciprocates with the piston, and a second yoke guide surface substantially perpendicular to the first guide surface and also located along the side of the cylinder and guiding the reciprocating yoke against movement in two directions at right angles to one another.

19. A crankless mechanism comprising a reciprocating piston, a cylinder for said piston, means forming a guide surface parallel to the longitudinal axis of the cylinder and located along the side of the cylinder, an axial cam the axis of which is parallel with the longitudinal axis of the cylinder, a connection between the cam and the piston, said connection including a yoke connected to and reciprocating with the piston and guiding the end of the piston, said yoke bearing against the guide surface along the side of the cylinder and being guided by said surface as the yoke reciprocates with the piston, and a pair of spaced apart substantially parallel yoke guide surfaces substantially perpendicular to the first mentioned yoke guide surface and also located along the side of the cylinder and also guiding the reciprocating yoke.

20. In mechanism comprising an axial cam and an axially parallel piston associated therewith, a cylinder block having a cylinder and a guide surface parallel to the longitudinal axis of the cylinder and located along the side of the cylinder, a yoke associated and reciprocating with said piston, and means independent of said piston guiding said yoke on said guide surface.

21. In mechanism comprising an axial cam an axially parallel piston associated therewith in thrust transmission relationship thereto, a cylinder block having an axially parallel guide surface located along side the cylinder substantially perpendicular to a line passing through the axes of the cam and piston and at least one additional guide surface substantially at right angles to the aforesaid guide surface on a line passing through the piston axis, and a yoke associating the piston with the cam and having projecting surfaces bearing upon said guide surface.

22. In a mechanism comprising an axial cam and an axially parallel piston associated therewith in thrust transmission relation thereto, a cylinder block having a cylinder for the piston, said block having an axially parallel guide surface located alongside the cylinder and substantially perpendicular to a plane passing through the axis of the cam and the center of thrust between the cam and the piston, a yoke associated and reciprocating with the piston and associating the piston with the cam, and means separate from the piston guiding said yoke on said guide surface.

23. In a mechanism comprising an axial cam and an axially parallel piston associated therewith in thrust transmission relation thereto, a cylinder block having a cylinder for the piston, said block having an axially parallel guide surface located alongside the cylinder and substantially perpendicular to a plane passing through the axis of the cam and the center of thrust between the cam and the piston, said block having another guide surface at right angles to the first mentioned guide surface and extending lengthwise of the piston axis, a yoke associated and reciprocating with the piston and associating the piston with the cam, and means separate from the piston guiding said yoke on said guide surfaces.

24. Mechanism comprising an axial cam member, a cylinder block, reciprocating means including a piston in the cylinder block and associated with the cam, means for transmitting thrust between the cam and the reciprocating means, means guiding the reciprocating means to move parallel to the longitudinal axis of the cam, said guiding means including a guiding surface alongside the cylinder block and spaced from a plane determined by the longitudinal axis of the cam and the center of thrust between the cam and the reciprocating means and intersected by a plane normal to that plane and parallel to the longitudinal axis of the cam and passing through the center of thrust.

25. A pump comprising a casing, a cylinder block at an end of the casing, a shaft extending in the casing, said shaft and said cylinder being rotatable with respect to one another about an axis parallel to the longtiudinal axis of the cylinder block, said shaft having an inclined cam in the casing, cylinders formed in the cylinder block with their longitudinal axes parallel to the axis of the shaft, pistons in the cylinders, driving connections between the pistons and the cam including yokes for the respective pistons straddling the cam and each having a trunnion projecting therefrom parallel to the axis of the shaft, the cylinder block having trunnion guiding surfaces on which the trunnions of the yokes bear.

26. A fluid power unit comprising a structure including a cylinder block having parallel cylinders formed therein, pistons in the cylinders, a cam, said cam and cylinder being rotatable with respect to one another about an axis parallel to the longitudinal axes of the cylinders, driving connections between the pistons and the cam comprising yokes straddling the cam and reciprocating with their associated pistons, said structure having two yoke-guiding surfaces substantially at right angles to one another for each yoke, and said yokes having cooperating surfaces bearing on the yoke-guiding surfaces and sliding thereon as the yokes reciprocate.

27. A fluid power unit comprising a structure including a cylinder block having parallel cylinders formed therein, pistons in the cylinders, a cam, said cam and cylinder being rotatable with respect to one another about an axis parallel to the longitudinal axes of the cylinders, driving connections between the pistons and the cam comprising yokes straddling the cam and reciprocating with their associated pistons, said structure having two yoke-guiding surfaces substantially at right angles to one another for each yoke, at least one of said yoke-guiding surfaces for each yoke being formed on the cylinder block, and said yokes having cooperating surfaces bearing on the yoke-guiding surfaces and sliding thereon as the yokes reciprocate.

28. In a power unit a hollow shaft having an inclined cam projecting therefrom, a casing enclosing the cam, a cylinder block having a plurality of cylinder bores surrounding the shaft, pistons reciprocable in the cylinder bores and connected to the cam for exchanging power between the pistons and the cam, said cylinder block and said shaft being rotatable with respect to one another about the longitudinal axis of the shaft, fluid discharge openings extending through the shaft and opening into the casing, and valve controlled fluid passageways communicating between the cylinder bores and the interior of the casing.

ZORRO D. RUBEN.

(References on following page)

REFERENCES CITED

The following references are of record in the file of this patent:

UNITED STATES PATENTS

| Number | Name | Date |
|---|---|---|
| 1,339,276 | Murphy | May 4, 1920 |
| 1,001,816 | Cassady | Aug. 29, 1911 |
| 1,769,552 | Sherman | July 1, 1930 |
| 2,178,972 | Sherman | Nov. 7, 1939 |
| 1,781,008 | Greening et al. | Nov. 11, 1930 |
| 1,781,069 | Michell et al. | Nov. 11, 1930 |
| 2,014,702 | Sherman | Sept. 17, 1935 |
| 2,324,524 | Mercier | July 20, 1943 |
| 2,364,099 | Ruben | Dec. 5, 1944 |
| 2,229,715 | Zimmerman | Jan. 28, 1941 |

FOREIGN PATENTS

| Number | Country | Date |
|---|---|---|
| 328,998 | Italy | Aug. 27, 1935 |